US012601444B2

(12) United States Patent
Sorensen et al.

(10) Patent No.: US 12,601,444 B2
(45) Date of Patent: Apr. 14, 2026

(54) THERMALLY INSULATED PIPE SYSTEM, THERMALLY INSULATING PIPE SECTION AND METHOD FOR PRODUCING A THERMALLY INSULATING PIPE SECTION

(71) Applicant: ROCKWOOL A/S, Hedehusene (DK)

(72) Inventors: Jannie Bakkaer Sorensen, Hedehusene (DK); Jens Eg Rahbek, Hedehusene (DK)

(73) Assignee: Rockwool A/S, Hedehusene (DK)

( * ) Notice: Subject to any disclaimer, the term of this patent is extended or adjusted under 35 U.S.C. 154(b) by 516 days.

(21) Appl. No.: 18/015,639

(22) PCT Filed: Jul. 6, 2021

(86) PCT No.: PCT/EP2021/068594
§ 371 (c)(1),
(2) Date: Jan. 11, 2023

(87) PCT Pub. No.: WO2022/017768
PCT Pub. Date: Jan. 27, 2022

(65) Prior Publication Data
US 2023/0250916 A1 Aug. 10, 2023

(30) Foreign Application Priority Data
Jul. 22, 2020 (EP) ..................................... 20187140

(51) Int. Cl.
*F16L 59/02* (2006.01)
*B23C 5/12* (2006.01)
*F16L 59/14* (2006.01)

(52) U.S. Cl.
CPC .............. *F16L 59/024* (2013.01); *B23C 5/12* (2013.01); *F16L 59/14* (2013.01)

(58) Field of Classification Search
CPC ..... F16L 59/022; F16L 59/023; F16L 59/024; F16L 29/025; F16L 59/02; F16L 59/04; F16L 59/14; B23C 5/08; B23C 5/12
(Continued)

(56) References Cited

U.S. PATENT DOCUMENTS

| | | | | | |
|---|---|---|---|---|---|
| 926,423 | A | * | 6/1909 | Kelly | ........................ F16L 9/14 138/140 |
| 3,204,668 | A | * | 9/1965 | Emerson, Jr. | ......... F16L 59/024 138/158 |

(Continued)

FOREIGN PATENT DOCUMENTS

| | | |
|---|---|---|
| CZ | 1080 U1 | 11/1993 |
| DE | 175253 C | 9/1906 |

(Continued)

OTHER PUBLICATIONS

International Search Report and Written Opinion of the ISA issued in PCT/EP2021/068594, mailed Sep. 13, 2021; ISA/EP.

*Primary Examiner* — David Bochna
(74) *Attorney, Agent, or Firm* — Harness, Dickey & Pierce, P.L.C.

(57) ABSTRACT

A thermally insulated pipe system includes a pipe with an outer diameter and a thermally insulating pipe section mounted on it. The pipe section has two longitudinal parts with longitudinal openings forming an aperture for the pipe. The parts face each other in a symmetry plane, with two webs in each opening that extend substantially to the symmetry plane and are arranged at an angle between 45° and 90°, forming a first groove between the webs and second grooves between each web and the surface of the opening.

19 Claims, 9 Drawing Sheets

(58) Field of Classification Search
USPC ........................................................ 285/47
See application file for complete search history.

(56) References Cited

U.S. PATENT DOCUMENTS

| | | | | |
|---|---|---|---|---|
| 3,503,122 A * | 3/1970 | Albrektson | ........... | F16L 59/024 |
| | | | | 408/1 R |
| 3,730,660 A * | 5/1973 | Raffenberg | ............. | F16L 59/04 |
| | | | | 425/301 |
| 3,755,039 A * | 8/1973 | Terry | .................... | F16L 59/023 |
| | | | | 156/212 |
| 6,213,157 B1 * | 4/2001 | Thiebaud | ................ | F16L 59/14 |
| | | | | 138/112 |
| 6,821,055 B2 * | 11/2004 | Oram | ........................ | F16L 1/20 |
| | | | | 405/195.1 |
| 6,983,768 B1 * | 1/2006 | Vujic | .................... | F16L 59/024 |
| | | | | 138/119 |
| 7,214,114 B2 * | 5/2007 | Gibson | ................ | E21B 17/012 |
| | | | | 441/133 |
| 2020/0072406 A1 * | 3/2020 | Furlong | ................ | F16L 59/024 |

FOREIGN PATENT DOCUMENTS

| | | | |
|---|---|---|---|
| DE | 1868129 | U | 2/1963 |
| EP | 0744574 | A1 | 11/1996 |
| EP | 1184614 | A2 | 3/2002 |
| FR | 1432804 | A | 3/1966 |
| WO | 9637728 | A1 | 11/1996 |
| WO | 2019043078 | A1 | 3/2019 |

* cited by examiner

THERMALLY INSULATED PIPE SYSTEM, THERMALLY INSULATING PIPE SECTION AND METHOD FOR PRODUCING A THERMALLY INSULATING PIPE SECTION

CROSS-REFERENCE TO RELATED APPLICATIONS

This application is a U.S. National Phase Application under 35 U.S.C. 371 of International Application No. PCT/EP2021/068594, filed on Jul. 6, 2021, which claims the benefit of European Patent Application No. 20187140.7, filed on Jul. 22, 2020. The entire disclosures of the above applications are incorporated herein by reference.

FIELD

The disclosure relates to a thermally insulated pipe system (pipework) comprising a pipe having an outer diameter and a thermally insulating pipe section mounted on said pipe, said pipe section comprising two longitudinal half-parts each having a longitudinal opening, providing an aperture for accommodating the pipe, whereby the two longitudinal half-parts are facing to each other in a symmetry plane. Furthermore, the present disclosure relates to a thermally insulating pipe section especially for a thermally insulated pipe system (pipework) as described before and comprising two longitudinal half-parts each having a longitudinal opening, providing an aperture for accommodating a pipe, whereby the two longitudinal half-parts are facing to each other in a symmetry plane. Finally, the present disclosure relates to a method for producing a thermally insulating pipe section as mentioned before comprising two longitudinal half-parts each having a longitudinal opening, providing an aperture for accommodating a pipe, whereby the two longitudinal half-parts are facing to each other in a symmetry plane.

BACKGROUND

This section provides background information related to the present disclosure which is not necessarily prior art.

Respective pipe systems and thermally insulating pipe sections are known in the art. Principally the pipe sections are preformed sections of e.g. mineral wool insulation, manufactured of two half-parts or pre-slit for ease of application and having a layer of factory applied foil facing and a self-adhesive lap. The self-adhesive lap allows the sections to be snapped onto the pipe system, then optionally backing tape is used to completely seal the joints.

Said thermally insulating pipe sections comprise a central longitudinal opening, providing an aperture for accommodating a pipe to be insulated, which dimension of the aperture typically equals the outer diameter of the pipe. Thus, for each and every different pipe dimension corresponding pipe sections need to be produced and put to stock. Since stockpiling and logistics are expensive, attempts have been made to address this problem. However, a need for improvements remains to date.

WO 96/37728 discloses a thermally insulating pipe section comprising two longitudinal parts each having a longitudinal opening, providing an aperture for accommodating a pipe, whereby the two longitudinal parts are facing to each other in a horizontal plane. The pipe section known from this prior art is composed of an assembly of annular insulation discs consisting of mineral fibers. The assembly has on one side a first through going cutting zone and on the other side a second non-through going cutting zone, the later serving to facilitate the opening of the pipe section when it is to be fitted on a pipe. The assembly of insulation discs is enveloped in a sheet material, for example of aluminum foil, which is glued onto the outer side of the assembly by means of an adhesive. In cross-section the assembly has a tube-like shape with an outer surface and an inner surface being directed to the pipe to be thermally insulated. The inner surface of the assembly has axially extending protrusions, so as to be usable for insulating pipes having different outer diameters. The protrusions are provided in a wave-like shape.

Furthermore, EP 1 184 614 A2 discloses a thermally insulating pipe section for insulating a pipe whereby the pipe section is made from mineral fibers. The pipe section has an outer cylindrical shape and an aperture having an oval or elliptical cross-section which results in that an inner surface of this pipe section totally lies against the outer surface of the pipe to be insulated. Air-pockets between the insulating pipe section and the pipe to be insulated can thereby be avoided.

Finally, EP 0 744 574 A1 discloses an insulating element for the insulation of parts of pipelines like pipe elbows, T-fittings or valve-parts. This pre-known insulating element is made from two longitudinal parts each having a longitudinal opening, providing an aperture for accommodating the before-mentioned parts of pipelines whereby the two longitudinal parts are facing to each other in a horizontal plane. The longitudinal openings of each part is provided with elastically or plastically formable or breakable rips. These rips are arranged parallel to each other and are arranged in equal distances to each other thereby forming recesses between two rips neighbored to each other. The parts of this pre-known pipe section are made from foam material having a limited adaptability and flexibility to an outer surface of a pipe. Therefore, the insulation of these pipe sections to the parts of pipelines as mentioned before leads to extensive work before fixing to the parts of the pipeline as the aperture of the pipe section has to be exactly prepared and shaped to give the necessary insulating properties.

SUMMARY

This section provides a general summary of the disclosure, and is not a comprehensive disclosure of its full scope or all of its features.

It is therefore an object of the disclosure to provide a thermally insulated pipe system (pipework) and a thermally insulating pipe section which is easily to be mounted with pipes of different diameters and which provides a tight arrangement of the thermally insulating pipe section on the pipe without any preparatory work to adjust the pipe section to the outer diameter or the outer shape of the pipe.

Furthermore, it is an object of the disclosure to provide a method for producing a thermally insulating pipe section in a continuous way as mass products on low costs.

With respect to the thermally insulated pipe system the before mentioned objects are achieved in that two webs are provided in each longitudinal opening of the pipe section half-parts, each web extending substantially up to the symmetry plane and being arranged under an angle ($\alpha$) between 45° and 90° relative to the symmetry plane, thereby incorporating a first groove between the webs and second grooves between each of the webs and a surface of the longitudinal opening.

Furthermore, the before-mentioned objects are achieved by a thermally insulating pipe section having two webs being provided in each longitudinal opening of the pipe section half-parts, each web extending substantially up to the symmetry plane and being arranged under an angle ($\alpha$) between 45° and 90° relative to the symmetry plane, thereby incorporating a first groove between the webs and second grooves between each of the webs and a surface of the longitudinal opening.

The thermally insulated pipe system according to the disclosure comprises a pipe having an outer diameter and a thermally insulating pipe section mounted on said pipe. Said pipe section comprises two longitudinal and substantially identical half-parts, each having a longitudinal space or opening for accommodating half of the pipe. Both spaces are forming the aperture for the pipe. The longitudinal space or opening of each diameter comprises a central first groove, a first side groove and a second side groove arranged on either side of the central first groove. The grooves defining a first wall between the central first groove and the first side groove and a second wall between the central groove and the second side groove, whereby the walls forming webs erecting from the part of the pipe section surrounding the pipe into the openings and the aperture, and whereby the webs extent substantially up to a symmetry plane which is a plane in which the two half-parts are connected to each other when the parts are fixed to the pipe. This symmetry plane divides the pipe section preferably into the two parts of identical shape. Nevertheless, it might be the possibility to divide the pipe section into more than two parts, especially into four parts thereby forming two symmetry planes at right angles to each other.

The webs being flexible are deflected by mounting the parts or the pipe section to the outer surface of the pipe so that the webs are used to close possible cavities and air pockets between the inner surface of the pipe section and the outer surface of the pipe. For this purpose, it might be of advantage to arrange the webs of each opening with its free ends slightly to the outer surface of the pipe section so that the groove between the webs has a trapezoidal cross-section. This feature has the effect that the webs are deflected in an intended direction towards the outside of the pipe section. The webs can partly be arranged with a slight deflection to the outer side of the pipe section. Since the webs extend substantially up to the symmetry plane these webs can easily be used for filling air-pockets around the outer circumference of the pipe. Because of the flexibility of the webs these webs are bend by arranging the halves around the pipe, whereby the webs stay in contact with the outer surface of the pipe. The thermally insulating pipe section can easily be mounted with pipes of different diameters in a certain range and the webs provide a tight arrangement of the thermally insulating pipe section on the pipe without any preparatory work to adjust the pipe section to the outer diameter or the outer shape of the pipe. The thermally insulating pipe section can therefore be used for pipes of different diameters without causing areas of insufficient insulation and/or with air-pockets. The webs give and can be used as additional insulation material to close such air-pockets.

According to a further embodiment of the disclosure the first groove has a width being larger than the width of each second groove, whereby the width of the first groove is around the threefold of the width of the second groove. The advantage of this embodiment is that the free ends of the webs, getting into contact with the outer surface of a pipe having a circular cross-section, are deflected to the outer side of the pipe section thereby getting in a nearly full contact with a side surface to the outer side of the pipe and providing improved insulating characteristics between the pipe section and the pipe.

Furthermore, it is preferably that each web has a width being smaller than the width of the first groove, whereby the width of the web is preferably between 15% and 50%, such as between 20% and 45%, of the width of the first groove. This embodiment gives the webs a good flexibility with respect to the deflection to the outer surface of the pipe section.

Preferably, the grooves and the webs are arranged symmetrically in the opening so that the parts of the pipe section can be used in either way to be mounted on a pipe. The use of the parts of the pipe section is therefore self-explanatory.

Preferably, the opening has a diameter being larger as or at least corresponding substantially to the outer diameter of the largest designated pipe of a range whereby the webs are used to compensate small differences between the outer diameter of the pipe and the diameter of the opening. Such a pipe section can be used for pipes of different diameters whereby the diameters of the pipes should not be varied in a large interval. Furthermore, the pipe section can be easily used for connecting areas of parts of pipes even in case of a recess at one end of a pipe to accommodate a part of a pipe to be connected with or for a certain range of pipes with different diameters.

According to a further embodiment of the disclosure the first groove has a depth corresponding at least to halve of the outer diameter of the pipe and a width being smaller than the outer diameter of the pipe and in that a total width between an outermost edge of the first of both second grooves to an outermost edge of the second of both second grooves corresponds at least to the outer diameter of the pipe. The width of the first groove is preferably between 30% and 90% of the outer diameter of the pipe, preferably between 35% and 80%, such as between 40% and 70%.

Furthermore, the first groove having a depth and a width, preferably has a depth being between 80 and 160% of the width, and a total width between an outermost edge of the first side groove to an outermost edge of the second side groove corresponds at least to twice the depth of the first groove. These features give the possibility to use the pipe section in connection with an insulated pipe system for a wide range of pipes to which the insulating pipe section is to be mounted.

The material of choice for the thermally insulating pipe section according to the present disclosure is factory made, bound mineral wool (MW), preferably stone wool. Said mineral wool products typically provided in densities of from 50 kg/m³ to about 150 kg/m³, preferably around 90 kg/m³ to 120 kg/m³. Such products are particularly suitable for building equipment and industrial installations and further specified in European Standard EN 14303:2009.

However, it should be noted that in principally the thermally insulating pipe sections might be produced utilizing other materials without departing from the scope of the disclosure, e.g. factory made flexible elastomeric foam (FEF), factory made polyethylene foam (PEF), or other substantially flexible foams for thermal insulation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further embodiments and advantages of the thermally insulated pipe system and the thermally insulting pipe section according to this disclosure are described in the following description of the accompanying drawings in which FIG. 1 is a first embodiment of a thermally insulating pipe section shown in cross-section;

FIG. 2 is a second embodiment of a thermally insulating pipe section shown in cross-section;

FIG. 3 is a third embodiment of a thermally insulating pipe section shown in cross-section;

FIG. 4 is a fourth embodiment of a thermally insulating pipe section shown in cross-section;

FIG. 6 is a fifth embodiment of a thermally insulating pipe section shown in cross-section

Figure 1:
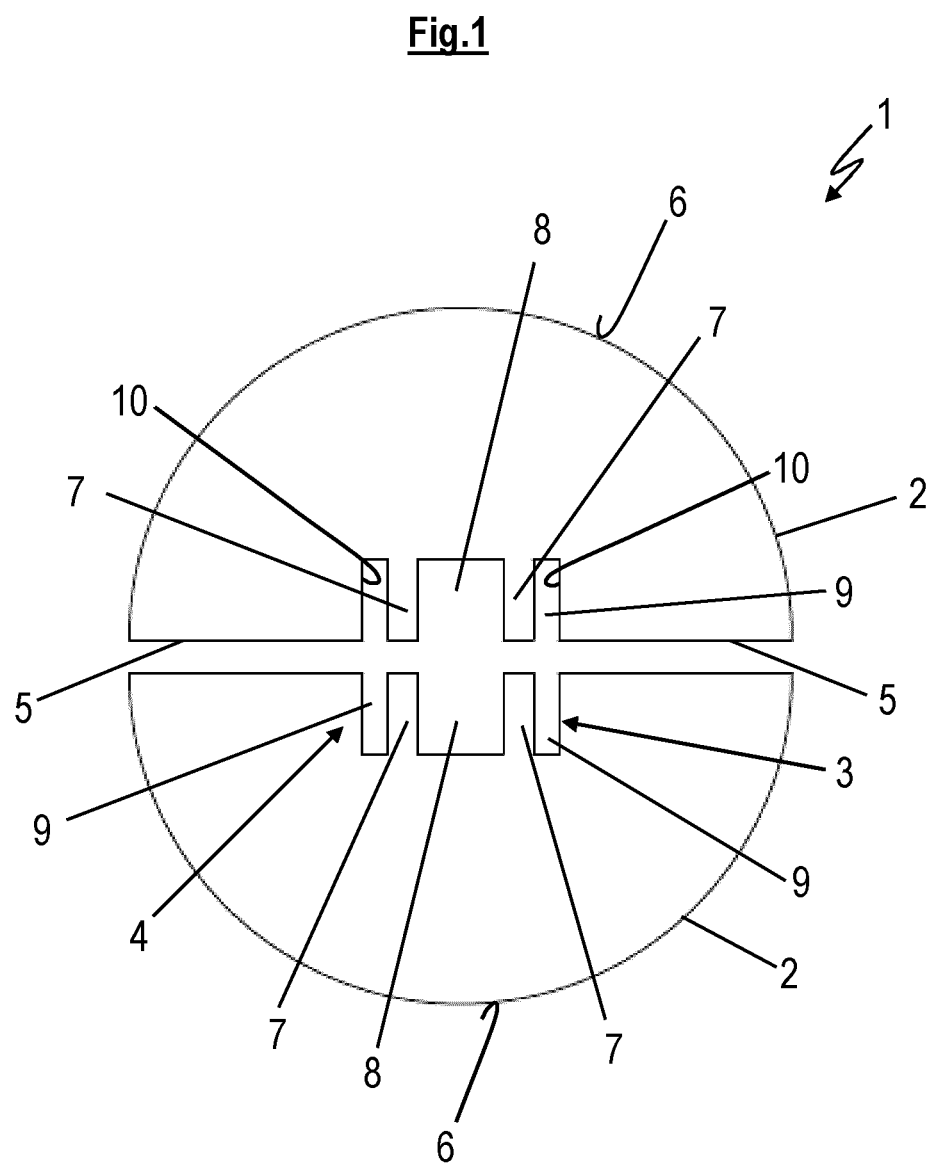
Figure 2:
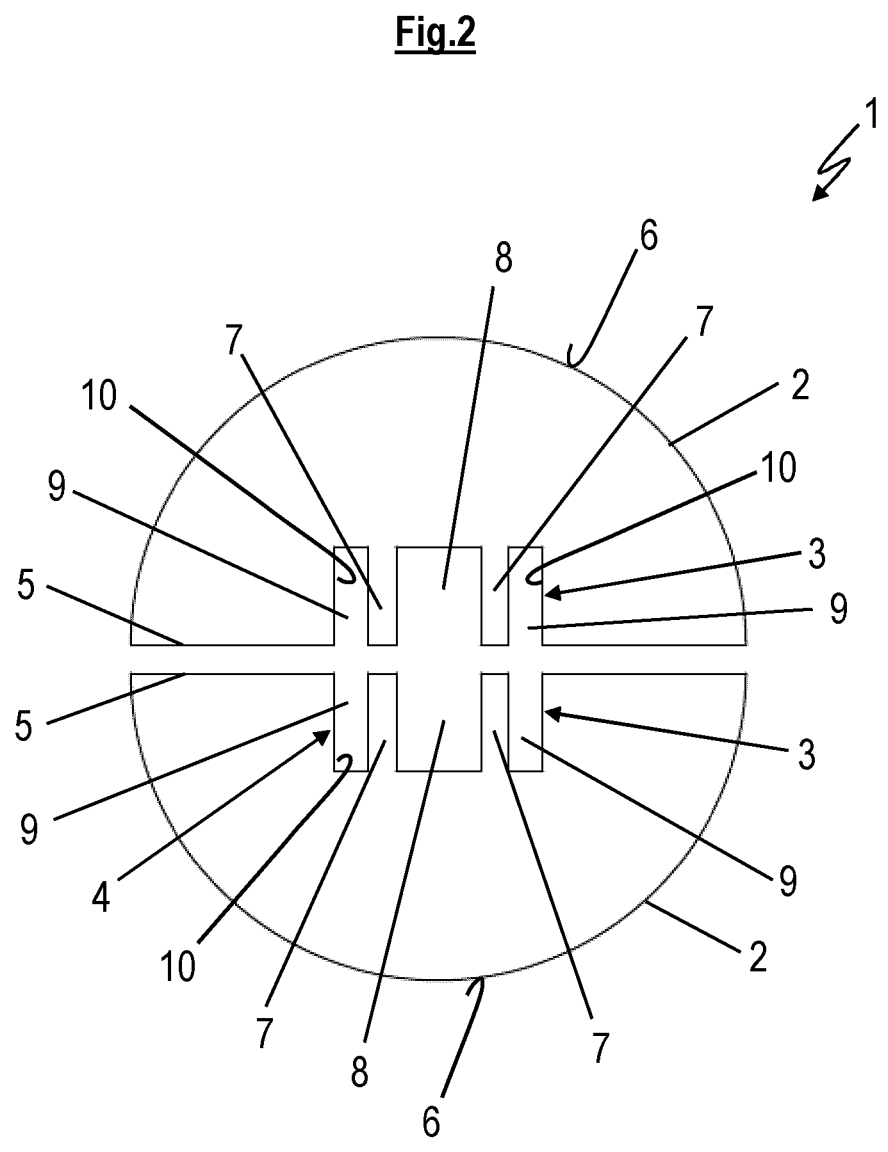
Figure 3:
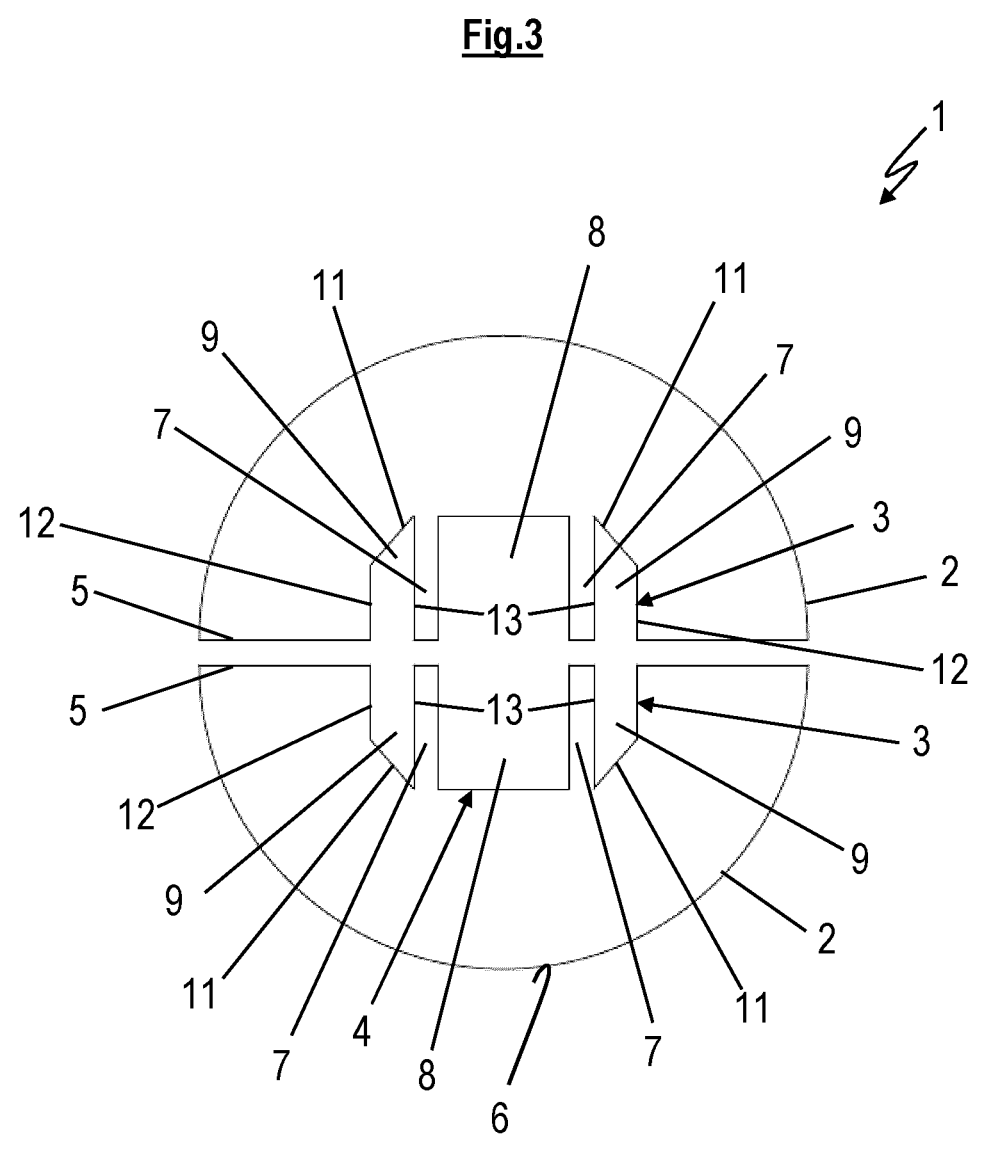
Figure 8:
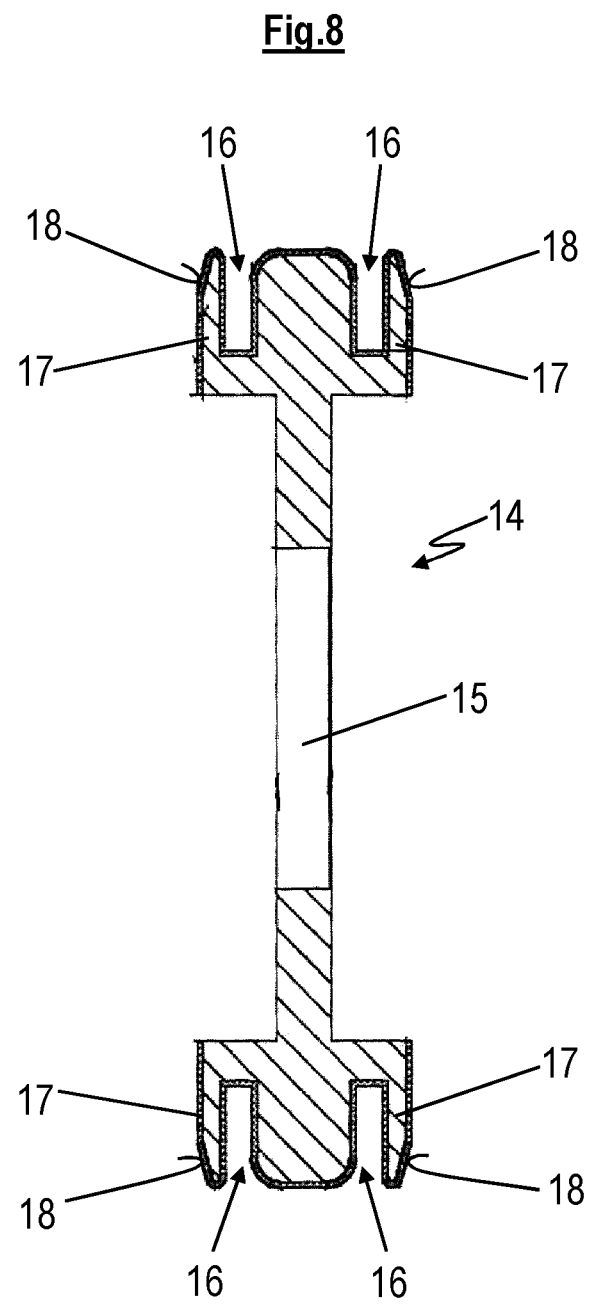

FIG. 8 is a tool for producing a thermally insulating pipe section according to FIGS. 3 and 4 shown in cut side view and The webs 7 are rectangular in cross-section. Furthermore, the first groove 8 and the second grooves 9 of the embodiments according to FIGS. 1 and 2 are rectangular in cross-section, too.

The embodiments according to FIGS. 3 and 4 differ in the size of the pipe section 1 and in the shape of the second grooves 9 which have a beveled ground 11 of the groove 9. The ground 11 is in such a way beveled that a wall 12 of the groove 9 is shorter than a parallel wall 13 of the groove 9 whereby the wall 12 is arranged closer to the outer surface 6 of the pipe section 1. Two grooves 9 of two parts 2 have therefore a trapezoidal cross-section.

As can be seen from the FIGS. 1 to 4 the first groove 8 has a width being larger than the width of each second groove 9, whereby the width of the first groove 8 is around the threefold of the width of the second groove 9, more specifically around 2.4 up to 3.7 times larger. Furthermore, each web 7 has a width being smaller than the width of the first groove 8, whereby the width of the web, depending on the size of the pipe section 1, corresponds to between 15% and 50% of the width of the first groove. The grooves 8, 9 and the webs 7 are arranged symmetrically in the opening 3.

From the following table 1 the dimensions of the pipe sections 1 in FIGS. 1 to 4 can be seen.

All dimensions are given in [mm].

| | Pipe sizes (range) | Pipe diameter (largest) D | Depth first groove dc | Depth second grooves ds | Total width Wt | Width first groove Wc | Width webs Ww | Width second grooves Ws |
|---|---|---|---|---|---|---|---|---|
| FIG. 1 | 12-18 | 18.0 | 9.5 | 9.5 | 23.0 | 9.5 | 4.0 | 2.75 |
| FIG. 2 | 22-28 | 28.0 | 14.0 | 14.0 | 30.0 | 12.0 | 4.0 | 5.0 |
| FIG. 3 | 32-38 | 38.0 | 20.0 | 20.0 | 45.0 | 21.0 | 5.0 | 7.0 |
| FIG. 4 | 42-48 | 48.0 | 27.0 | 27.0 | 57.0 | 28.0 | 7.0 | 7.5 |

Figure 6:
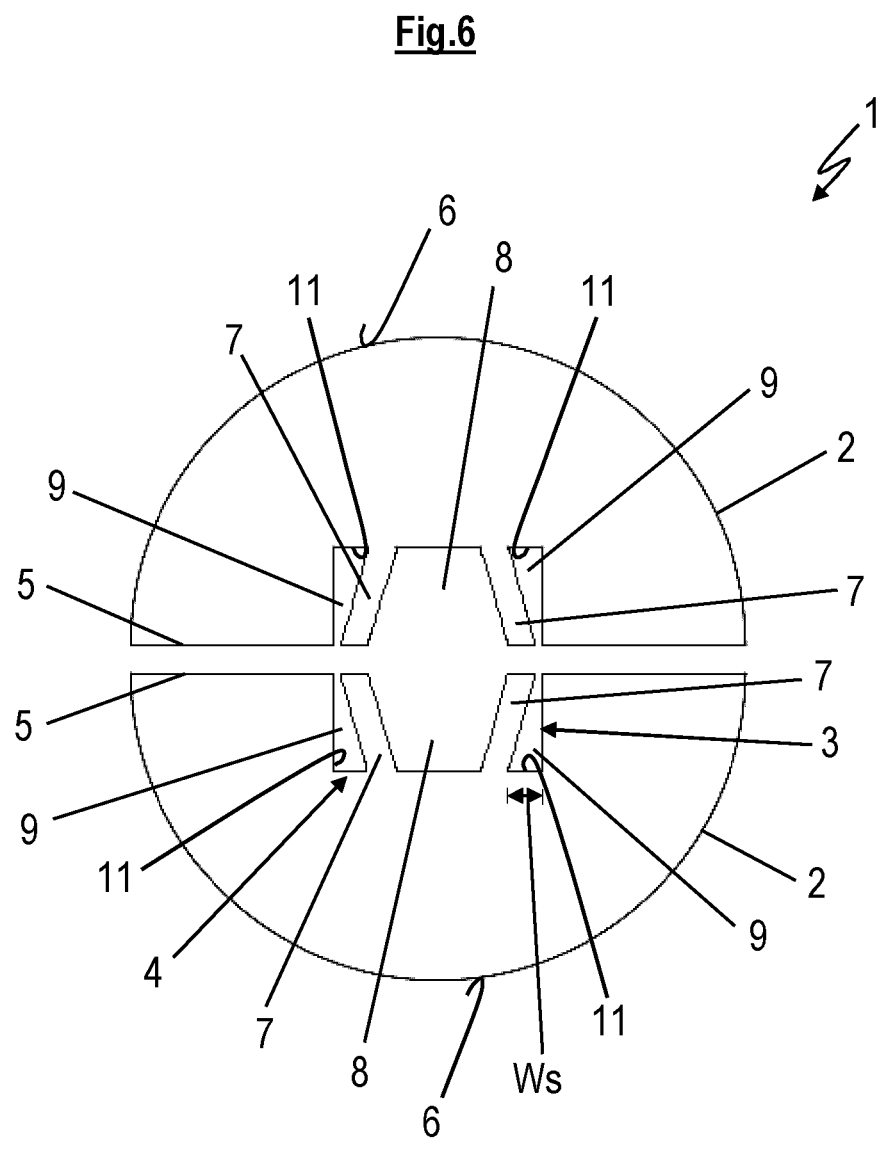
Figure 9:
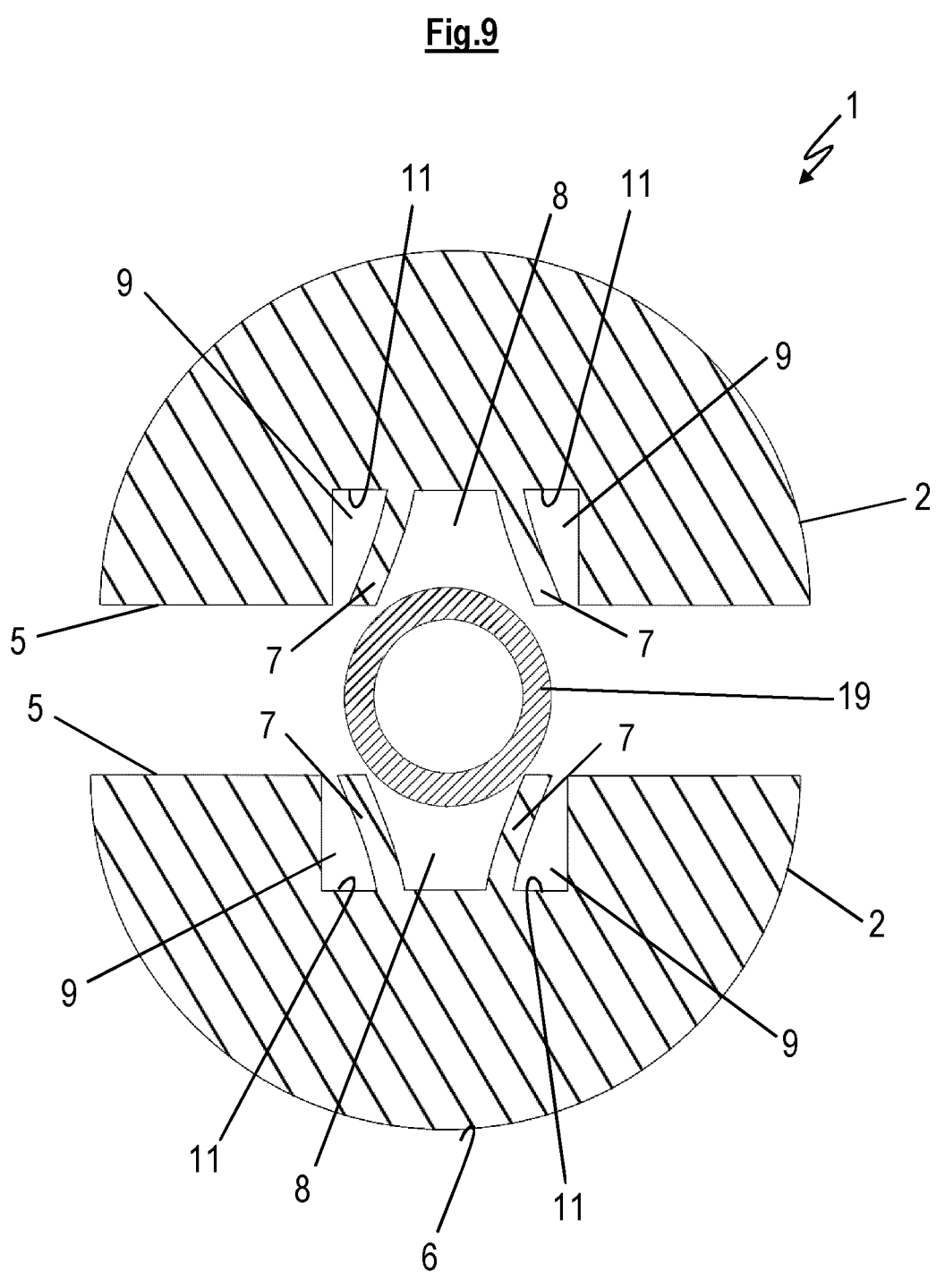

FIG. 9 is another view of the fifth embodiment according to FIG. 6.

Corresponding reference numerals indicate corresponding parts throughout the several views of the drawings.

DETAILED DESCRIPTION

Example embodiments will now be described more fully with reference to the accompanying drawings.

FIGS. 1 to 4 show four embodiments of a thermally insulating pipe section 1 especially differing in its size. The pipe section 1 consists of two longitudinal parts 2 being identical in shape and each having a longitudinal opening 3 forming an aperture 4 for accommodating a pipe being not shown in FIGS. 1 to 4. The parts 2 are facing to each other in a symmetry plane 5 dividing the pipe section into two halve shells.

The pipe section 1 has an outer surface 6 and consists of factory made, bound mineral wool, preferably stone wool. Its density measured in accordance with EN13470:2001 is about 110 kg/m³.

In each opening 3 two webs 7 are provided extending substantially up to the symmetry plane 5 and being arranged under an angle (α) of 90° relative to the symmetry plane 5, thereby incorporating a first groove 8 between the webs 7 and second grooves 9 between the webs 7 and an inner surface 10 of the longitudinal opening 3.

Part 2 and webs 7 are formed as one piece.

From table 1 it can be seen that the depth dc of the first groove 8 is equal or bigger than halve of the pipe diameter D, the width Wc of the central first groove 8 is smaller than the diameter D of the pipe, the total width Wt of the opening 3 is equal or bigger than the diameter D of the pipe, the depth dc of the first groove 8 is equal to the depth ds of the side grooves 9, the total width Wt of the opening 3 is bigger than twice the depth dc of the first groove 8. Therefore, the depth dc of the first groove 8 is approximately 95% to 117% of the width Wc of the first groove 8 whereas the width Wc of the first groove 8 is about 43 to 58% of the diameter D of the pipe and the width Ww of the webs 7 is between 71 and 145% of the width Ws of the second grooves 9. Furthermore, the width Wc of the first groove 8 is approximately 40 to 49% of the total width Wt of the opening 3 and the width Ww of the webs 7 is approximately 11 to 17% of the total width Wt of the opening 3 and the width Ws of the second grooves 9 is approximately 12 to 17% of the total width Wt of the opening 3.

Figure 5:
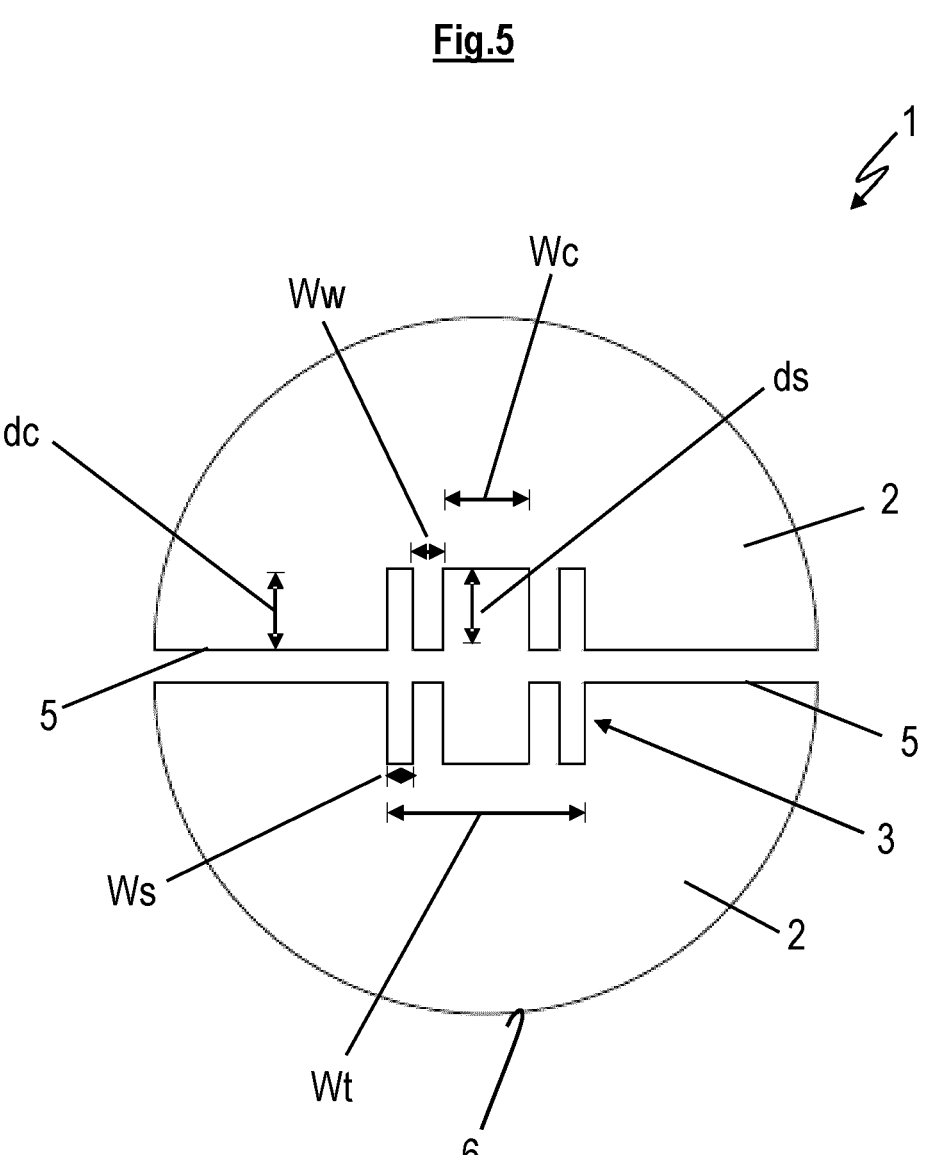
FIG. 5 shows relative dimensions of the thermally insulating pipe section.

FIG. 5 shows the thermally insulating pipe section 1 according to FIG. 4 with its relative dimensions as given in table 1. These dimensions are valid for all embodiments according to FIGS. 1 to 3, 6 and 9, too.

FIGS. 6 and 9 show a further embodiment of a thermally insulating pipe section 1 according to the disclosure differing from the embodiments according to FIG. 1 to 4 by diverging webs 7. In respect of the present example according to FIG. 6 the webs 7 are arranged at an angle ($\alpha$) of about 70° relative to the symmetry plane. The first groove 8 is shaped trapezoid, and the second grooves 9 have a larger width in the area of its grounds 11 compared to the width Ws close to a free end of the web 7.

The shape of the opening 3 with the first groove 8 the second grooves 9 and the webs 7 between the first groove 8 and the second grooves 9 are produced by using a rotatably driven tool 14 which tool 14 is relatively moved to a part 2 thereby forming both webs 7 extending substantially to the symmetry plane 5 and being arranged under an angle of 90° relative to the symmetry plane 5. Forming both webs 7 means that in a part 2 formed as a solid material grooves 8 and 9 are cut from this solid material. For this purpose, the tool 14 is a milling cutter which is discoidal having a central opening 15 and border areas with two recesses 16 flanked by cutting elements 17. The edges of the cutting element 17 are rounded edges.

FIG. 9 shows the embodiment according to FIG. 6 together with a pipe 19 shortly before the two parts 2 of the pipe section 1 are arranged close to an outer surface of the pipe 19, thereby deflecting the webs 7 in directions to the outer surface 6 of the pipe section 1.

Figure 7:
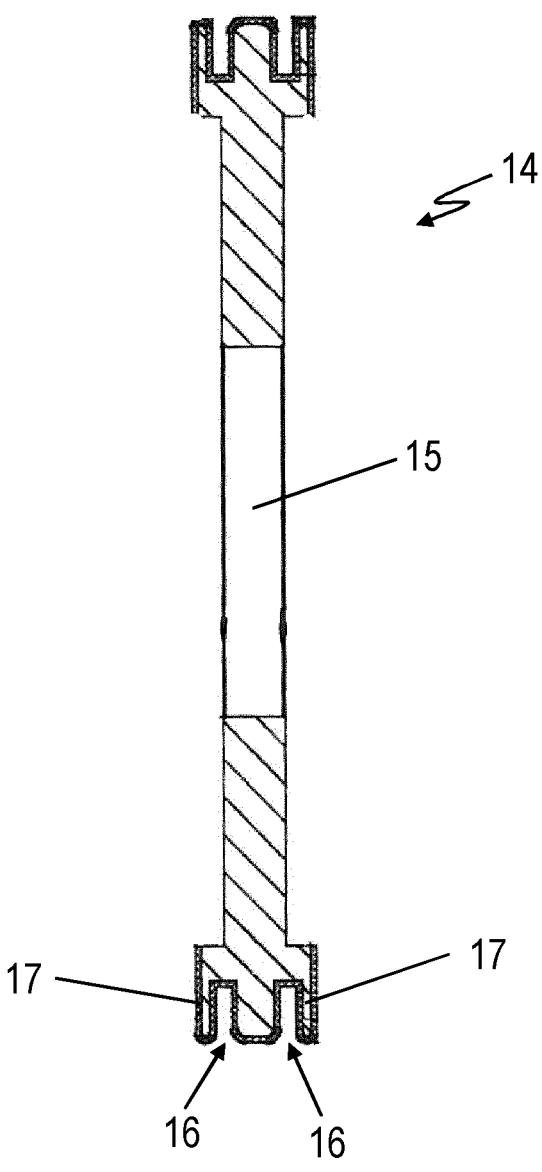
FIG. 7 is a tool for producing a thermally insulating pipe section according to FIGS. 1 and 2 shown in cut side view.

FIG. 7 shows the tool with which the opening 3 of the embodiments of the pipe section 1 according to FIGS. 1 and 2 is cut whereas FIG. 6 shows the tool 14 with which the opening 3 of the pipe section 1 according to FIGS. 3 and 4 is provided in the pipe section 1 and FIG. 8 shows that the outer cutting elements have beveled faces 18 to form the grounds 11 of the second grooves 9.

During the production of thermally insulating pipe sections 1 several blanks made of mineral fibers and a binder having a semi-circular cross-section are moved in line to a machine having at least one tool 14 being driven rotatably, thereby cutting the first groove 8 and the second grooves 9 into the blanks so that the pipe sections 1 can be produced continuously.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A thermally insulated pipe system comprising a pipe having an outer diameter and a thermally insulating pipe section mounted on said pipe, said pipe section comprising two longitudinal parts each having a longitudinal opening, providing an aperture for accommodating the pipe whereby the two longitudinal parts are facing to each other in a symmetry plane,
wherein
two webs are provided in each longitudinal opening of the parts, each web extending substantially up to the symmetry plane and being arranged under an angle ($\alpha$) between 45° and 90° relative to the symmetry plane, thereby incorporating a first groove between the webs and second grooves between each of the webs and a surface of the longitudinal opening, wherein the first groove has a width (Wc) being larger than the width (Ws) of each second groove, whereby the width (Wc)

of the first groove is around the threefold of the width (Ws) of the second groove.

2. The pipe system according to claim 1, wherein the longitudinal parts are identical in shape.

3. The pipe system according to claim 1, wherein the grooves and the web are arranged symmetrically in the opening.

4. The pipe system according to claim 1, wherein the opening has a diameter being larger as or at least corresponding substantially to the outer diameter of the pipe.

5. The pipe system according to claim 1, wherein the first groove has a depth (dc) corresponding at least to half of the outer diameter of the pipe and a width (Wc) being smaller than the outer diameter of the pipe and in that a total width (Wt) between an outermost edge of the first of both second grooves to an outermost edge of the second of both second grooves is larger than or at least corresponds substantially to the outer diameter of the pipe.

6. The pipe system according to claim 1, wherein the width (Wc) of the first groove is between 30% and 95% of the outer diameter of the pipe.

7. The pipe system according to claim 6, wherein the width (Wc) of the first groove is between 35% and 80% of the outer diameter of the pipe.

8. The pipe system according to claim 7, wherein the width (Wc) of the first groove is between 40% and 70% of the outer diameter of the pipe.

9. A thermally insulated pipe system comprising a pipe having an outer diameter and a thermally insulating pipe section mounted on said pipe, said pipe section comprising two longitudinal parts each having a longitudinal opening, providing an aperture for accommodating the pipe whereby the two longitudinal parts are facing to each other in a symmetry plane,
wherein
two webs are provided in each longitudinal opening of the parts, each web extending substantially up to the symmetry plane and being arranged under an angle ($\alpha$) between 45° and 90° relative to the symmetry plane, thereby incorporating a first groove between the webs and second grooves between each of the webs and a surface of the longitudinal opening, wherein each web has a width (Ww) being smaller than the width (Wc) of the first groove.

10. The pipe system according to claim 9, wherein the width (Ww) of the web is between 15% and 50% of the width (Wc) of the first groove.

11. The pipe system according to claim 10, wherein the width (Ww) of the web is between 20% and 45% of the width (Wc) of the first groove.

12. A thermally insulating pipe section comprising two longitudinal parts each having a longitudinal opening, providing an aperture for accommodating a pipe, whereby the two longitudinal parts are facing to each other in a symmetry plane, wherein two webs are provided in each longitudinal opening of the parts, each web extending substantially up to the symmetry plane and being arranged under an angle ($\alpha$) between 45° and 90° relative to the symmetry plane, thereby incorporating a first groove between the webs and second grooves between each of the webs and a surface of the longitudinal opening, wherein the webs are rectangular in cross-section and wherein the second grooves are trapezoidal in cross-section.

13. The thermally insulating pipe section according to claim 12, wherein the parts are made of mineral wool.

14. The thermally insulating pipe section according to claim 12, wherein the first groove has a width (Wc) being larger than the width of each second groove, whereby the width (Wc) of the first groove is around the threefold of the width (Ws) of the second groove.

15. The thermally insulating pipe section according to claim 12, wherein each web has a width (Ww) being smaller than the width (Wc) of the first groove.

16. The thermally insulating pipe section according to claim 15, wherein the width (Ww) of the web is between 15% and 50% of the width (Wc) of the first groove.

17. The thermally insulating pipe section according to claim 16, wherein the width (Ww) of the web is between 20% and 45% of the width (Wc) of the first groove.

18. The thermally insulating pipe section according to claim 12, wherein the grooves and the webs are arranged symmetrically in the opening.

19. A method for producing a thermally insulating pipe section comprising two longitudinal parts each having a longitudinal opening, providing an aperture for accommodating a pipe, whereby the two longitudinal parts are facing to each other in a symmetry plane, wherein a first groove between two webs and second grooves between each of the webs and a surface of the longitudinal opening are cut into each longitudinal opening of each part by using a rotatably driven tool which tool is relatively moved to the part thereby forming both webs extending substantially to the symmetry plane and being arranged under an angle ($\alpha$) between 45° and 90° relative to the symmetry plane, and such that each web has a width (Ww) that is smaller than the width (Wc) of the first groove.

\* \* \* \* \*